Patented Mar. 28, 1944

2,345,110

UNITED STATES PATENT OFFICE 2,345,110

PROCESS FOR IMPROVING FIBROUS MATERIAL AND THE MATERIAL TREATED BY SUCH A PROCESS

Charles Graenacher, Riehen, Richard Sallmann, Bottmingen, Otto Albrecht, Munchenstein, and Jost Frei, Basel, Switzerland, assignors to the firm Society of Chemical Industry in Basle, Basel, Switzerland No Drawing. Application May 26, 1939, Serial No. 276,026. In Switzerland May 31, 1938

14 Claims. (Cl. 8—116)

(1) This invention relates to a process for improving fibrous materials by treating the materials with products of the general formula

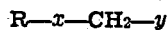
R—x—CH₂—y wherein R represents an organic radical containing at least one basic group and less than 10 carbon atoms without including the basic group, $x$ stands for a hetero-atom and $y$ stands for the radical which determines the solubility of the product in water and is united with the —CH₂— group by a hetero-atom, and heating the thus treated material. In the above formula the organic radical R may stand for example for a hydrocarbon radical or an acyl radical. Basic radicals in the products of the above formula may be for example amino or imino groups, for instance in the form of thiourea radicals, further onium groups, such as quaternary ammonium groups or ternary sulfonium groups. By the expression "hetero-atoms" there are to be understood as usual such atoms which are different from carbon atoms and which may be a member of a hetero-cycle, as is the case with oxygen, sulfur or nitrogen. The hetero-atoms oxygen, sulfur and nitrogen may also be defined as atoms of elements contained in the 5th and 6th group of the periodic system of the elements, the atomic weight of which amounts to at most 32 and is practically an even number. The expression "practically" means in this case that the atomic weights round off to even numbers may be used for practical purposes instead of the exact values. In the above formula the hetero-atom oxygen may be united as an ethereal bridge with the —CH₂— group on the one hand, and with a hydrocarbon radical R on the other hand. The hetero-atom oxygen may however also unite the group —CH₂— with an acyl radical. The hetero-atom nitrogen may also unite as an —NR₁— bridge or as a member of an amide-like radical

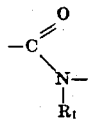

($R_1$=hydrogen or a hydrocarbon radical which may be substituted) the —CH₂— group with the radical R. As groups determining the solubility of the product in water there may be named onium-groups, for instance quaternary ammonium groups or ternary sulfonium groups, further amino and imino groups in the form of salts, for example thiourea radicals, further carboxylic acid, sulfonic acid, thiosulfuric acid and sulfuric acid ester groups.

(2) Products of the general formula first above written are for example quaternary ammonium compounds of the general formula

R—x—CH₂—q—z wherein R and $x$ have the significance indicated in section 1, $q$ is the quaternary nitrogen atom and $z$ a monovalent anion.

(a) Products of the general formula last given, in which $x$ is the nitrogen atom of the

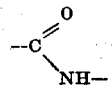

group are quaternary salts wherein the nitrogen atom of the quaternary ammonium group is united over the methylene bridge to the nitrogen atom of a carboxylic acid amide group, such quaternary salts being obtainable in the known manner from aliphatic, aromatic, mixed aliphatic-aromatic, cycloaliphatic or heterocyclic carboxylic acid amides which contain at least one basic group by means of formaldehyde and a salt of a tertiary amine.

The quaternary ammonium salts to be used therefore are derived for example from the following carboxylic acid amides: products of addition of tertiary amines to halogenated carboxylic acid amides such as chloracetamide, β-chloropropionic acid amide, α-bromobutyric acid amide, α-bromolauric acid amide, α-bromostearic acid amide, 2:9:10-tribromostearic acid amide, chlorosuccinic acid diamide, para-chloromethyl-benzamide, naphthenic acid amides and resin acid amides which contain halogen atoms capable of exchange, further dimethylamino-acetic acid amides, diethylamino-acetic acid amides, piperazino acetic acid amides, N-piperidino acetic acid amides, sulfobenzamide. The carboxylic acid amides may also be dyestuff intermediate products. As tertiary amines may be named for example trimethylamine, triethylamine, dimethylcyclohexylamine, dimethylaniline, pyridine, C-alkylpyridine, quinoline.

These quaternary salts may be made be treating the carboxylic acid amide which contains at least one basic group in known manner with formaldehyde, especially paraformaldehyde and a salt of a tertiary amine or an addition product of an inorganic anhydride and a tertiary amine, if desired in presence of a free tertiary amine. Alternatively the N-methylolcarboxylic acid amide obtainable from the carboxylic acid amide in the known manner may be caused to react with a salt or addition product of the tertiary amine preferably in presence of a free tertiary amine to form the quaternary ammonium salt. Finally the carboxylic acid amide or its N-methylol derivative may be caused to react with the formaldehyde and tertiary amine or with tertiary amine alone in presence of an organic carboxylic anhydride, for instance phthalic anhydride to produce the quaternary ammonium salt. The reaction is preferably conducted with moderate heating, for example to 50-100° C. When solid materials are being treated it is preferable to add a solvent such as benzene, toluene or an excess of free tertiary amine.

Among the salts of tertiary amines in the last preceding paragraph there are suitable for the reaction for example pyridine hydrochloride, pyridinehydrobromide, pyridine-meta-nitrobenzene sulfonate and pyridine oxalate. As addition products of inorganic anhydrides those made from sulfurdioxide or sulfurtrioxide come into question.

(b) A further possibility for arriving at products of the general formula

namely products of the general formula

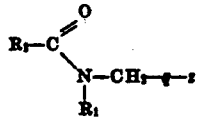

wherein

stands for an acyl radical containing at least one basic group, $R_1$ stands for alkyl and $q$ and $z$ have the significance stated in the first paragraph of this section 2, consists in causing the corresponding halogen compound

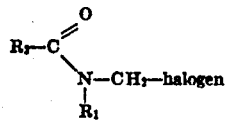

to react with a tertiary amine suitable for the formation of a quaternary ammonium compound. The halogen compounds necessary for this reaction are obtainable in known manner from the carboxylic acid amides which have a basic group or a reactive substituent capable of being transformed into a basic group and a hydrogen atom at the nitrogen atom of the carboxylic acid amide group, by means of a hydrogen halide and formaldehyde. This reaction is preferably conducted in the presence of a solvent, for instance benzene. It is to be recommended that water produced during the reaction should be continuously removed, for example as an azeotropic mixture with the solvent or with aid of a substance that unites with water, for instance anhydrous magnesium sulfate. For example the amide and the para-formaldehyde may be suspended in boiling benzene and hydrogenchloride introduced, the eliminated water being distilled in admixture with benzene. The union of the halogen compound with the tertiary amine may be procured in known manner, for instance by allowing them to stand together at room temperature or while moderately heating.

(c) Further products of the general formula

wherein R, $q$ and $z$ have the significance already explained, and $x$ is the nitrogen atom of a

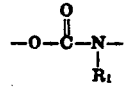

group ($R_1$=alkyl), may be made by analogous processes from the corresponding halogen-methyl compounds with the group

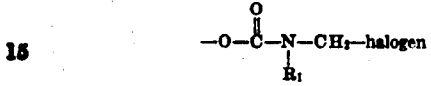

which are procurable in known manner and a tertiary amine. Urethanes with the group

may be converted by the method already given into the corresponding quaternary ammonium compounds.

(3) Further products which may be used in this invention and correspond with the general formula R—$x$—CH₂—$y$, namely quaternary salts of the general formula

wherein R, $q$ and $z$ have the significance given in section 2 above and $x$ is an oxygen atom, a sulfur atom or the oxygen atom of a

group which is united with the —CH₂— group, made be made from the corresponding α-halogenmethylethers, α-halogenmethylthioethers or α-halogenmethylcarboxylic acid esters and tertiary amines. The α—halogenmethylether or α—halogenmethylthioether may be made from the alcohol or mercaptan respectively which comprises at least one basic group or at least one reactive substituent capable of being transformed into a basic group, for example from ethylenechlorhydrin, 3-chloropropanol-(1), 2:3-dichloropropanol-(1), 2-chloro-2-methylpropanol-(1) by reaction with formaldehyde and halogenhydride. When the α-halogen methylethers of the last named halogenated alcohols are treated with tertiary amines products containing two quaternary ammonium groups are produced. The halogenmethyl carboxylic acid esters of carboxylic acids which besides the carboxyl group contain a basic group or a substituent capable of being transformed into a basic group may be prepared by the process known for making choloromethylesters of fatty acids of low molecular weight and of chloracetic acid. The addition of tertiary amines to the very reactive halogenmethyl compounds occurs very easily at room temperature or by moderate heating.

(4) As products of the general formula

there may be used those in which R and $x$ have the significance given in section 1 and $y$ is the radical of a thiourea, if desired in the form of a salt. Such products can be made for example from N-methylolamides of carboxylic acids which contain besides the carboxylic acid amide group at least one basic group or a substituent capable of being transformed into a basic group as described in application Serial No. 251,848, filed January 19, 1939, by reaction with thiourea preferably in the presence of alcoholic hydrochloric acid while moderately heating.

(5) Products of the general formula

R—x—CH₂—y also include those in which the radical y has been exchanged for the atom grouping —v—R₃—w. In such products which have the general formula R—x—CH₂—v—R₃—w wherein R and x have the significance given in section 1, v is an oxygen atom, if desired in the form of an ester-like bridge, a sulfur atom or a $$-\underset{\underset{O}{\parallel}}{C}-NR_4-$$

group, R₃ is an organic radical, w is a group determining or enhancing the solubility in water and R₄ is a hydrogen atom or a hydrocarbon radical which may contain substituents. Such products may be made by the methods described in application Serial No. 238,084, filed October 31, 1938, now Patent No. 2,206,167, it being premised however that the radical R contains a basic group or a substituent capable of being transformed into a basic group for instance by treating with amines.

(a) For example the procedure may be such that by known methods products of the general formula R—x—CH₂—v—R₃—s wherein R, x, v and R₃ have the foregoing significance and s is a substituent capable of conversion into a group which determines solubility, for instance a halogen atom, an oxy-group or a tertiary amino group are made and thereupon the substituent s is converted into a group that determines or enhances solubility.

For example by the foregoing methods a product of the above formula may be made by causing an α-halogenmethylether, α-halogenmethylsulfide or α-halogenmethylcarboxylic acid ester which contains in addition to the halogenmethyl group a basic group or a substituent capable of being transformed into a basic group, to react with a metal salt of a halogen carboxylic acid or a hydroxycarboxylic acid, for instance chloracetic acid, dichloracetic acid, α-bromolauric acid, chloromethylbenzoic acid, chloromethylsalicylic acid, glycollic acid or lactic acid or with a halogen alcohol or polyhydric alcohol, for instance, ethylenechlorhydrin, glycol, glycerine, polyglycerine, mannite, mono- or polysaccharides or alkaline metal compounds thereof and then exchanging at least one halogen atom or one free hydroxygroup for the group which is to determine or enhance the solubility. Alternatively an α-halogenmethylether of a halogen alcohol, for example the α-chloromethyl ether of ethylenechlorhydrin or a halogenmethylester of a halogencarboxylic acid, for instance chloromethylchloracetic acid ester may be caused to react with a carboxylic acid salt which contains besides the salt group a basic group or a substituent capable of being transformed into a basic group and thereupon introducing the group which determines or enhances solubility. Furthermore products of the above formula may be made by acylating an N-methylolamide.

The components may be caused to react by mixing them at room temperature or at a raised temperature, if desired in presence of a solvent, for example benzene or chloroform. Since the α-halogenmethylether, α-halogenmethylsulfide and chloromethylcarboxylic acid esters are comparatively reactive it frequently suffices to maintain the mixture at about 20–40° C. The reaction of carboxylic acid halogenmethylesters with the salts of carboxylic acids may be conducted for example in the manner known for producing methyleneglycoldiacetate. The acylation of N-methylolcarboxylic acid amides occurs especially smoothly when carboxylic acid anhydride or chloride is used. As groups which determine or enhance solubility there may be named for example sulfonic acid, thiosulfuric acid, sulfuric acid ester, phosphoric acid and carboxylic acid groups in free or neutralized form; also onium groups such as quaternary ammonium groups or ternary sulfonium groups.

For introducing such groups that determine or enhance solubility the product containing besides a basic group or a substituent capable of being transformed into a basic group at least one reactive halogen atom may be caused to react, for example with sodium thiosulfate or another thiosulfate or with sodium sulfite at room temperature or at a raised temperature, if desired in presence of a solvent, for instance water, alcohol, acetone or a mixture of any of these. It may be preferable to add a catalyst, for instance copper powder, a copper salt or an alkali-iodide.

In the case of products of the general formula

R—x—CH₂—v—R₃—s wherein R, x, v and R₃ have the foregoing significance and s is a reactive halogen atom, s may be converted by addition of a tertiary amine, for instance trimethylamine, triethanolamine, dimethylaniline, dimethylcyclohexylamine, or pyridine so as to form a quaternary ammonium compound. The addition of the tertiary amine may occur during the production of a condensation product of the general formula R—x—CH₂—v—R₃—q—anion wherein R, x, v, R₃ and q have the foregoing significance.

(6) The products of the kind related in sections 2, 3, 4 and 5 of this specification containing, as indicated, in the radical R a basic group may be caused to act on textile materials preferably by impregnating the material with a solution or dispersion of the product, if desired in presence of a catalyst, for instance a weak acid or acid salt and subsequent treatment at a raised temperature, for instance 115–120° C. As solvent or dispersing agent water is best, especially in the case of products of low molecular weight. However other organic solvents, for instance pyridine, dimethylaniline or dioxane may be used. Where a dispersion is necessary this can be made by known methods.

The products of the kind related in sections 2, 3, 4 and 5 containing, as indicated, in the radical R a substituent capable of being transformed into a basic group, for instance a halogen atom, may be caused to act on textile materials, whereupon the materials may be treated with ammonia, a primary, secondary or tertiary amine such as methylamine, monoethanolamine, diethanolamine, trimethylamine, triethylamine, triethanolamine, pyridine or dimethylaniline; reaction may occur in the known manner at an ordinary or raised temperature.

The material, especially cellulose material or material containing cellulose which has been treated according to the invention, has basic properties and may be dyed deep fast tints with acid dyestuffs such as acid wool dyestuffs or acid dyestuffs containing metal in complex union, mordant dyestuffs, sulfuric acid ester salts of vat dyestuffs, dyestuff esters or amides such as are described in U. S. Patent 2,095,600 and in U. S. Patent No. 2,235,480. Dyestuff intermediate products of acid character are also absorbed by the textile materials containing basic groups. Direct dyestuffs yield for example on basic cellulose derivatives, obtainable by the process of the invention, dyeings which in general are more fast to washing than those obtained on the untreated material; this is probably due to the formation of a salt. The acid dyestuff taken up by the basic cellulose derivative can, if its constitution permits, be diazotized on the fiber and developed in the usual manner with an azo-component. It is also possible to treat a suitable dyestuff on the fiber with a diazonium compound.

Similarly to the acid dyestuffs and their intermediate products other compounds of an acid nature, for instance fatty acids, resin acids, naphthenic acids, sulfuric acid esters of alcohols of high molecular weight or of hydroxy-fatty acids and their esters, also sulfonic acids of high molecular weight which contain besides an aliphatic or cycloaliphatic radical of high molecular weight an external sulfonic acid group, for instance cetylsulfonic acid, oleyloxyethane-sulfonic acid, N-oleyl-N-methylaminoethane sulfonic acid, N-benzyl-μ-heptadecylbenzimidazoldisulfonic acid, sulfophthalic acid-mono-octadecylester and salts of these acids may be absorbed by the textile material containing the basic groups, in particular the basic cellulose derivatives. By suitable choice of the components there may be obtained in this manner a surprisingly soft feel of the goods.

By the application of the process to textile materials such as wool and silk which already contain basic groups, the basic character of the material may be increased.

(7) In case the process of the invention is applied to colored textile goods, there is the possibility of enhancing the fastness of the dyeings especially the fastness to washing. These dyeings which have been obtained with dyestuffs forming colored anions like dyestuffs containing sulfo-groups whether these dyestuffs are for instance acid wool dyestuffs or direct cotton dyestuffs are improved by treatment with the products of the kind in question which contain basic groups or groups capable of conversion thereinto. The products to be used in the invention are soluble in water or easily dispersed therein and may be decomposed by heat or by treatment with saponifying agents whereupon they separate as insoluble bodies. If this decomposition occurs on the substratum, for instance a textile, the insoluble body separates in an adherent form. It may impart, according to its nature, valuable properties to the fiber. Among these may be mentioned the waterproof or water-repellent character fast to washing which in some cases is connected with an especial softness and fullness, which latter may be still further enhanced by addition of a suitable filling agent.

There may be also a considerable diminution of the hygroscopic character and an increase of insulating properties with reference to heat and electricity. As further properties which can be imparted to the fiber there may be named the prevention of the tendency to crease, prevention of the shifting of the threads, diminution of lustre, increase of stability to water, prevention of shrinking of the fabric and in the case of wool the prevention of felting. By local application of the process, calendering effects, matte effects and damask effects may be produced and also color effects which have their origin in the changed affinity of the fiber to dyestuffs. When the process is applied to colored textiles the properties of the dyeings such as fastness to light, to rubbing, to washing and to water are essentially increased. These different effects may be interconnected.

The process is applicable to vegetable and animal fibrous material or to fibrous artificial products, for instance cellulose or materials containing cellulose, cotton, viscose artificial silk, copper artificial silk, paper, wool, silk and mixed fibrous materials, for instance in the form of threads or fabrics. Moreover materials of artificial fibers which contain cellulose or cellulose derivatives or protein substances may be treated.

The products used for the process of the invention may be used alone or together with other materials, for instance salts, especially those of feeble acid, for instance sodium acetate and together with solvents, soapy substances and protective colloids may be used as dressing, weighting and softening or matting agents.

The following examples illustrate the invention, the relationship of parts by weight to parts by volume is that which exists between the kilo and the liter.

*Example 1*

Cotton fabric is impregnated with an aqueous solution of 10 per cent strength of the quaternary compound of the formula

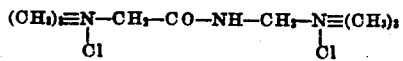

at 30–40° C. with addition of sodium acetate and so much formic acid that the solution reddens blue litmus paper. It is then squeezed, dried and heated for 1–2 hours at 115–125° C. The material thus obtained and lightly rinsed shows a pronounced affinity for acid wool dyestuffs.

The above used quaternary compound may be obtained as follows:

12.3 parts of methylolchloracetamide are dissolved in 50 parts per volume of alcohol, 30 parts by volume of benzene solution of trimethylamine of 22 per cent strength by volume are added and the whole is allowed to stand at room temperature over night. There are then added 9.5 parts of trimethylamine hydrochloride and the whole is boiled for one hour under reflux. After distilling the alcohol and benzene the new quaternary ammonium compound remains in the form of a colorless deliquescent mass which is freely soluble in water.

The product of the formula

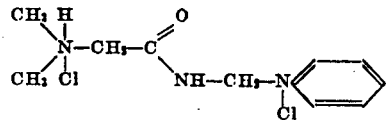

obtainable in analogous manner or the product of the formula

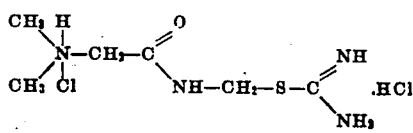

may find application in similar manner. The acetyl radical present in the above products may also be replaced by a corresponding valeric acid radical.

Example 2

Cotton fabric is treated with the product of addition of pyridine to N-methyl-N-chloromethyl-chloroacetamide, corresponding probably to the formula

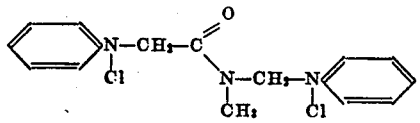

in the following manner:

3.1 parts of the condensation product from N-methyl-N-chloromethyl-chloroacetamide and pyridine are dissolved in 5 parts of water, 2.7 parts of crystallized sodium acetate are added and the solution is made up to 30 parts by volume. A piece of cotton fabric is impregnated with this solution, squeezed, dried at 50° C. and then heated to 120° C. during 10 minutes. After washing out and drying the cotton fabric treated in this manner has a good affinity for wool dyestuffs.

The product of addition used can be prepared as follows:

In a solution of 5.3 parts of N-methylchloroacetamide in 40 parts by volume of dry benzene are suspended 1.6 parts of paraformaldehyde and dry hydrochloric acid is introduced at 0–10° C., while stirring. When the solution does no longer take up hydrochloric acid it is filtered and the residue introduced into 20 parts by volume of pyridine. After allowing the mixture to stand for 24 hours it is heated for 1 hour to 50–60° C. and the pyridine is distilled in a vacuum at the same temperature.

The product of the formula

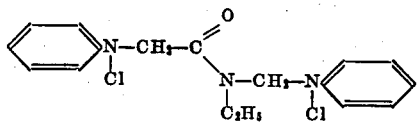

obtainable according to an analogous process may be used in similar manner.

Example 3

Cotton fabric is treated with the product of addition of pyridine to the β-chlorethoxy-methylester of chloroacetic acid, corresponding in all probability to the formula

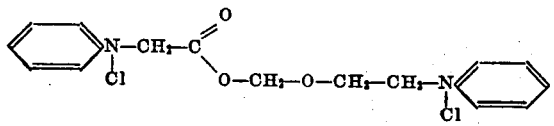

in the following manner:

3.4 parts of the condensation product from sodium chloroacetate, chloromethyl-β-chloroethylether and pyridine are dissolved in 5 parts by volume of water, 2.8 parts of sodium acetate are added and the solution is made up to 30 parts by volume. A piece of cotton fabric is impregnated with this solution, squeezed, dried at 50° C. and then heated to 120° C. during 10 minutes. After rinsing in hot water and drying the cotton fabric thus treated has a good affinity for wool dyestuffs.

The product of addition used can be prepared as follows:

To a suspension of 11.6 parts of finely pulverized sodium chloroacetate in 80 parts by volume of dry acetone there are added by drops and while well stirring, at 0–10° C., 12.8 parts of chloromethyl-β-chloroethylether dissolved in 30 parts by volume of dry acetone. After all has been added stirring is further continued for 12 hours at ordinary temperature and the solution is then filtered. The filtrate is freed from acetone in a vacuum, mixed with 20 parts by volume of pyridine while stirring and allowed to stand for 2 days at ordinary temperature. The pyridine is then distilled at 40–50° C. in a vacuum.

Instead of the above mentioned quaternary compound there may also be used the analogous product obtainable with pyridine. Instead of the radical derived from the acetic acid the products may contain a corresponding radical derived from valeric acid.

Example 4

Cotton fabric is treated with the product of addition of pyridine to the N-β-chloroethoxy-methyl-chloroacetic acid amide, corresponding probably to the formula

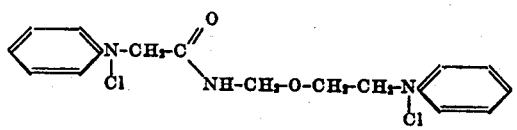

in the following manner:

3.4 parts of the condensation product from chloromethyl-chloroethylether, chloroacetamide and pyridine are dissolved in 5 parts of water. To this solution are added 2.7 parts of crystallized sodium acetate and the whole is made up to 34 parts by volume. A piece of bleached cotton fabric is impregnated with this solution, squeezed, dried at 50° C. and heated for 10 minutes to 120° C. After rinsing in hot water and drying the material thus treated has a good affinity for wool dyestuffs.

The product of addition used can be prepared as follows:

10 parts of chloroacetamide are heated with 20 parts of chloromethyl-β-chloroethylether for 3 hours to 90–100° C., while stirring. After the chloromethyl-chloroethylether in excess has been distilled in a vacuum, 30 parts by volume of pyridine are poured over the residue and the whole is heated for 2 hours on the vapor bath. The pyridine in excess is then distilled in a vacuum.

Example 5

Cotton fabric is treated with the product of addition of pyridine to the urethane of the formula

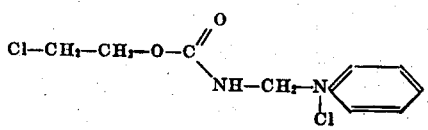

which product of addition corresponds probably to the formula

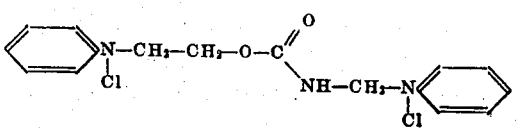

in the following manner:

3.3 parts of the condensation product from β-chloro-urethane, para-formaldehyde, pyridine and pyridine hydrochloride are dissolved in 5 parts of water, and 2.8 parts of sodium acetate dissolved in so much water are then added that the total volume amounts to 33 parts by volume. A piece of bleached cotton fabric is impregnated with this solution, squeezed, dried at 50° C. and heated for 10 minutes to 120° C. After rinsing in hot water and drying the material thus treated has a good affinity for wool dyestuffs.

The product of addition used can be prepared as follows:

10 parts of β-chloroethyl-urethane are introduced into 20 parts by volume of pyridine. 2.4 parts of para-formaldehyde and 20 parts of pyridine hydrochloride are added to this solution while stirring, and the whole is heated for 2 hours to 85–90° C. The pyridine in excess is distilled in a vacuum and the condensation product is left behind in the form of a viscous, very hygroscopic mass.

*Example 6*

Cotton fabric is handled at 30–40° C. for 15–20 minutes in an aqueous solution containing 10 per cent of the product formed by the action of the addition product of pyridine and α-bromostearic acid amide with formaldehyde and pyridine hydrochloride in presence of pyridine, there being 3.3 per cent of anhydrous sodium acetate in the liquor; the fabric is then squeezed, dried at 50–60° C. and then heated for 5 hours at 115–120° C. It is then rinsed in boiling hot water and dried. By this treatment a very soft feel is produced in the material. Moreover the latter has a pronounced affinity for acid dyestuffs.

The addition product corresponding probably to the formula

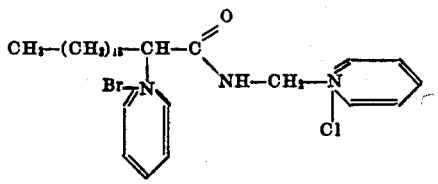

may be obtained as follows:

A mixture of 2 parts of the addition product obtainable from α-bromostearic acid amide and pyridine, 0.28 part of paraformaldehyde, 1.3 parts of pyridinehydrochloride and 10 parts by volume of pure pyridine is heated in a bath at 75–80° C. for 4 hours, while stirring. The product is precipitated by adding petroleum ether and then freed from volatile constituents at a low temperature preferably under diminished pressure. There is thus obtained a semi-solid mass which is taken up by water to produce a solution which foams when shaken.

*Example 7*

Cotton fabric is treated as described in Example 6 with an aqueous solution of the product of reaction of α-bromolauric acid amide with formaldehyde, pyridine hydrochloride and excess of pyridine or with a solution of the product of reaction similarly obtained from 2:9:10-tribromostearic acid amide. There is thus obtained a textile material which has properties similar to those of the material obtained as described in Example 6.

The addition product corresponding probably to the formula

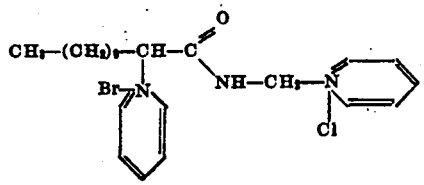

may be obtained as follows:

A mixture of 2 parts by weight of α-bromolauric acid amide, 1.4 parts of pyridine-hydrochloride, 0.43 part of paraformaldehyde and 10 parts by volume of pyridine is heated while stirring for 6 hours in a bath at 75–80° C. The product is then precipitated by adding diethyl-ether and freed from volatile constituents at low temperature preferably under diminished pressure. A semi-solid mass is thus obtained which is taken up by water to form a clear mass which foams strongly when shaken.

What we claim is:

1. A process for improving fibrous materials which comprises treating the materials with a product of the formula

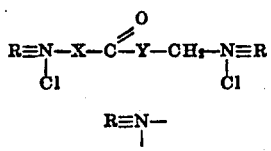

wherein $$R\equiv N-$$

represents the radical of a tertiary amine selected from the group consisting of trimethylamine and pyridine, X represents a bridge selected from the group consisting of —CH₂— and —CH₂CH₂O—, and Y represents a bridge selected from the group consisting of —NH— and —OCH₂OCH₂—, X representing —CH₂— when Y is —OCH₂OCH₂ and Y representing —NH— when X is —CH₂CH₂O—, drying the thus treated materials and heating them to a temperature of at least 100° C.

2. Fibrous materials treated at a temperature of at least 100° C., after previous drying, with a product of the formula

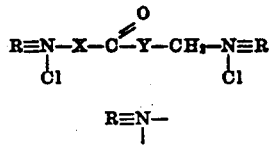

wherein $$R\equiv N-$$

represents the radical of a tertiary amine selected from the group consisting of trimethylamine and pyridine, X represents a bridge selected from the group consisting of —CH₂— and —CH₂CH₂O—, and Y represents a bridge selected from the group consisting of —NH— and —OCH₂OCH₂—, X representing —CH₂— when Y is —OCH₂OCH₂ and Y representing —NH— when X is —CH₂CH₂O—, which fibrous materials have basic properties.

3. A process for improving fibrous materials which comprises treating the materials with the product of the formula

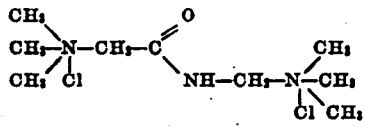

drying the thus treated materials and heating them to at least 100° C.

4. A process for improving fibrous materials which comprises treating the materials with the product of the formula

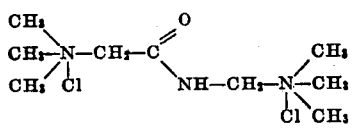

drying the thus treated materials and heating them to a temperature of 100–150° in presence of an alkaline salt of a weak acid.

5. Fibrous materials treated at temperatures of at least 100 C. after previous drying with a product of the formula

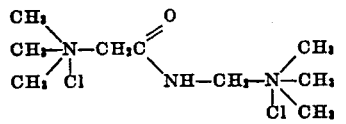

which fibrous materials have basic properties.

6. Fibrous materials treated at temperatures of at least 100° C. after previous drying with a product of the formula

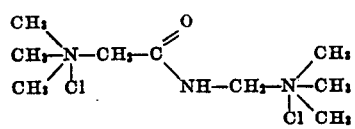

in presence of an alkaline salt of a weak acid, which fibrous materials have basic properties.

7. A process for improving fibrous materials which comprises treating the materials with the product of the formula

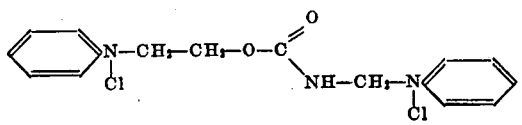

drying the thus treated materials and heating them to at least 100° C.

8. A process for improving fibrous materials which comprises treating the materials with the product of the formula

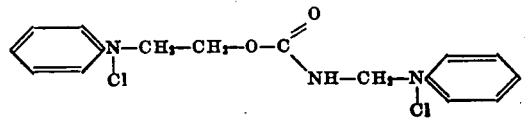

drying the thus treated materials and heating them to a temperature of 100–150° in presence of an alkaline salt of a weak acid.

9. Fibrous materials treated at temperatures of at least 100° C. after previous drying with a product of the formula

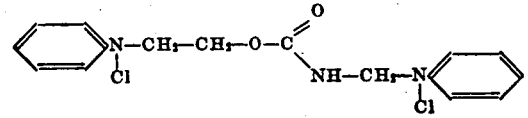

which fibrous materials have basic properties.

10. Fibrous materials treated at temperatures of at least 100° C. after previous drying with a product of the formula

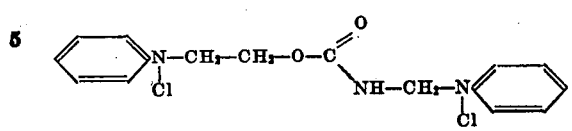

in presence of an alkaline salt of a weak acid, which fibrous materials have basic properties.

11. A process for improving fibrous materials which comprises treating the materials with a product of the formula

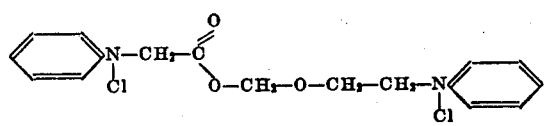

drying the thus treated materials and heating them to at least 100° C.

12. A process for improving fibrous materials which comprises treating the materials with a product of the formula

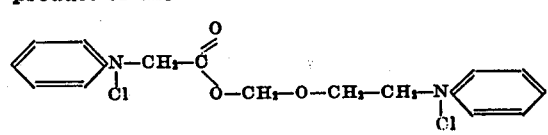

drying the thus treated materials and heating them to a temperature of 100–150° in presence of an alkaline salt of a weak acid.

13. Fibrous materials treated at temperatures of at least 100° C. after previous drying with a product of the formula

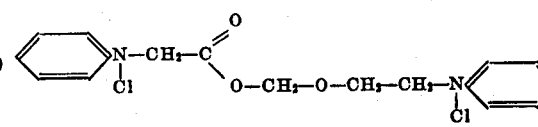

which fibrous materials have basic properties.

14. Fibrous materials treated at temperatures of at least 100° C. after previous drying with a product of the formula

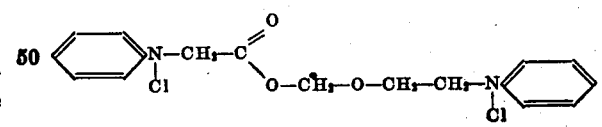

in presence of an alkaline salt of a weak acid, which fibrous materials have basic properties.

CHARLES GRAENACHER.
RICHARD SALLMANN.
OTTO ALBRECHT.
JOST FREI.